United States Patent

Harmuth

[15] 3,705,981

[45] Dec. 12, 1972

[54] SEQUENCY FILTERS BASED ON WALSH FUNCTIONS FOR SIGNALS WITH TWO SPACE VARIABLES

[72] Inventor: Henning Friedolf Harmuth, Bethesda, Md.

[73] Assignee: International Telephone and Telegraph Corporation, Nutley, N.J.

[22] Filed: Oct. 5, 1970

[21] Appl. No.: 77,996

[52] U.S. Cl. ...............235/193, 179/15 BC, 235/197

[51] Int. Cl. ............................G06f 15/34, G06g 7/26

[58] Field of Search......................235/193, 181, 197; 178/DIG. 25, DIG. 34, DIG. 3; 340/348; 179/15 BC

[56] References Cited

OTHER PUBLICATIONS

Harmuth, " A Generalized Concept of Frequency and Some Applications," IEEE Transactions on Information Theory; Vol. IT- 14, No. 3 pgs. 375- 382 May 1968

Henderson, " Some Notes on the Walsh Functions" ; IEEE Transactions on Electronic Computers, February 1964, pgs. 50- 52

Shanks, " Computation of the Fast Walsh–Fourier Transform," IEEE Transactions on Computers, May 1969, pgs. 457- 459

Siemens et al., " Digital Walsh–Fourier Analysis of Periodic Waveforms" IEEE Trans. on Instrumentation and Measurement, Vol. IM- 18, No. 4, pgs. 316–321 December 1969

Pratt et al., " Hadamard Transform Image Coding," Proceedings of the IEEE, Vol. 57, No. 1, January 1969, pages 58- 68

*Primary Examiner*—Joseph F. Ruggiero

*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

The present invention relates to a sequency sampling filter based on Walsh functions for signals having two space variables, $x$ and $y$. Voltages derived from the $x$, $y$ plane of a space domain are transformed into voltages in the $k,m$ plane of the sequency domain. The filtering process is performed by not feeding certain voltages $a(\ k,m)$ to the circuit which performs the inverse transformation of voltages in the sequency domain back into the space domain.

4 Claims, 19 Drawing Figures

INVENTOR
HENNING F. HARMUTH
BY Vincent B. Ingrassia
AGENT

INVENTOR
HENNING F. HARMUTH
BY Vincent B. Ingrassia
AGENT

INVENTOR
HENNING F. HARMUTH
BY Vincent B. Ingrassia
AGENT

Fig. 7

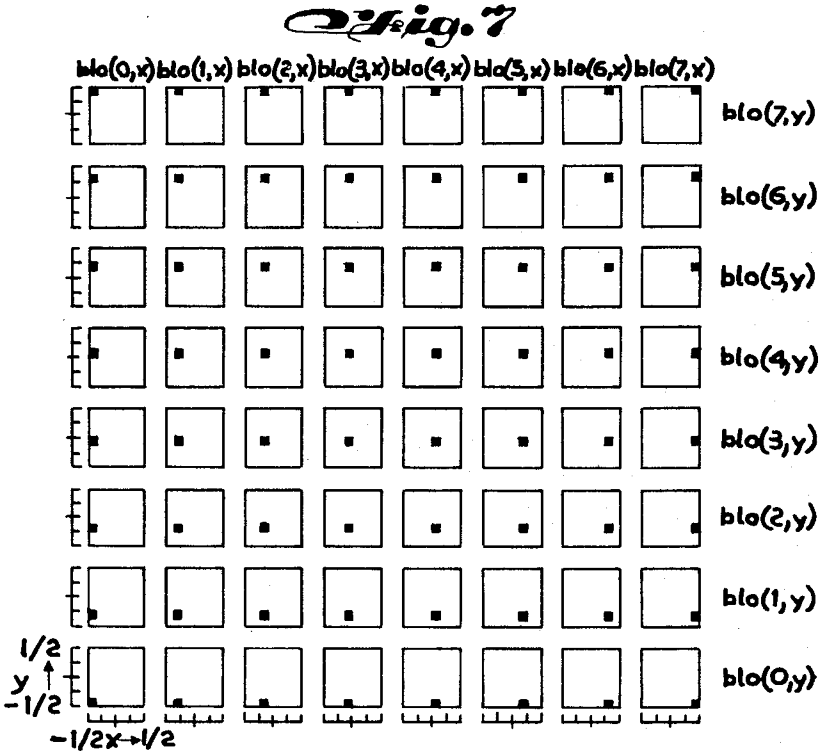

Fig. 11

| K | $\eta_3$ | $\eta_2$ | $\eta_1$ | $\eta_0$ | $(-1)^{\eta_3}$ | $(-1)^{\eta_2}$ | $(-1)^{\eta_1}$ | $(-1)^{\eta_0}$ | 16x → 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|---|---|---|---|---|---|
| 0 | 0 | 0 | 0 | 0 | +1 | +1 | +1 | +1 | + | + | + | + | + | + | + | + | + | + | + | + | + | + | + | + |
| 1 | 0 | 0 | 0 | 1 | +1 | +1 | +1 | −1 | + | + | + | + | + | + | + | + | − | − | − | − | − | − | − | − |
| 2 | 0 | 0 | 1 | 0 | +1 | +1 | −1 | +1 | + | + | + | + | − | − | − | − | − | − | − | − | + | + | + | + |
| 3 | 0 | 0 | 1 | 1 | +1 | +1 | −1 | −1 | + | + | + | + | − | − | − | − | + | + | + | + | − | − | − | − |
| 4 | 0 | 1 | 0 | 0 | +1 | −1 | +1 | +1 | + | + | − | − | − | − | + | + | + | + | − | − | − | − | + | + |
| 5 | 0 | 1 | 0 | 1 | +1 | −1 | +1 | −1 | + | + | − | − | − | − | + | + | − | − | + | + | + | + | − | − |
| 6 | 0 | 1 | 1 | 0 | +1 | −1 | −1 | +1 | + | + | − | − | + | + | − | − | − | − | + | + | − | − | + | + |
| 7 | 0 | 1 | 1 | 1 | +1 | −1 | −1 | −1 | + | + | − | − | + | + | − | − | + | + | − | − | + | + | − | − |
| 8 | 1 | 0 | 0 | 0 | −1 | +1 | +1 | +1 | + | − | − | + | + | − | − | + | + | − | − | + | + | − | − | + |
| 9 | 1 | 0 | 0 | 1 | −1 | +1 | +1 | −1 | + | − | − | + | + | − | − | + | − | + | + | − | − | + | + | − |
| 10 | 1 | 0 | 1 | 0 | −1 | +1 | −1 | +1 | + | − | − | + | − | − | + | − | − | + | + | − | + | − | − | + |
| 11 | 1 | 0 | 1 | 1 | −1 | +1 | −1 | −1 | + | − | − | + | − | − | + | − | + | − | − | + | − | + | + | − |
| 12 | 1 | 1 | 0 | 0 | −1 | −1 | +1 | +1 | + | − | + | − | − | + | − | + | + | − | + | − | − | + | − | + |
| 13 | 1 | 1 | 0 | 1 | −1 | −1 | +1 | −1 | + | − | + | − | − | + | − | + | − | + | − | + | + | − | + | − |
| 14 | 1 | 1 | 1 | 0 | −1 | −1 | −1 | +1 | + | − | + | − | + | − | + | − | − | + | − | + | − | + | − | + |
| 15 | 1 | 1 | 1 | 1 | −1 | −1 | −1 | −1 | + | − | + | − | + | − | + | − | + | − | + | − | + | − | + | − |

INVENTOR
HENNING F. HARMUTH
BY Vincent B. Ingrassia
AGENT

INVENTOR
HENNING F. HARMUTH
BY Vincent B. Ingrassia
AGENT

INVENTOR
HENNING F. HARMUTH
BY Vincent B. Ingrassia
AGENT

INVENTOR
HENNING F. HARMUTH
BY Vincent B. Ingrassia
AGENT

INVENTOR
HENNING F. HARMUTH
BY Vincent B. Ingrassia
AGENT

SEQUENCY FILTERS BASED ON WALSH FUNCTIONS FOR SIGNALS WITH TWO SPACE VARIABLES

BACKGROUND OF THE INVENTION

The present invention relates to filters for signals having space variables.

The theory of filters for signals with time as variable has reached a high degree of sophistication, but the same cannot be said of filters for signals with space variables. It is only during the last years that such filters have been implemented by optical means or by digital computers. The widespread use of television, which uses signals with two space variables and a time variable, has not resulted in the development of filters for the space variable signals. The reason seems to be that equipment based on sine-cosine functions is most easily implemented if sine-cosine are functions of time rather than space. For instance, a tunable generator for time functions V sin $2\pi it/T$ having $i/T=20$ to 20,000 oscillations per second is readily implemented. On the other hand, a tunable generator for a space function V sin $2\pi x/X$ having $i/X=20$ to 20,000 oscillations per meter is extremely hard to implement.

Filters based on Walsh functions can be implemented with about equal effort for signals with the time variable or one space variable. These filters can actually be built with electronic components up to the ultimate case of signals with the time variable and three space variable. Of course, the complexity of the filter increases rapidly as the number of variables increases.

Two kinds of filters for signals with space variables have emerged so far: instantaneous filters and sampling filters. The instantaneous filters work very fast, about 100 to 1,000 times faster than required for filtering television signals. They are expensive and can be implemented economically only for resolutions much below that of TV pictures. The sampling filters work more slowly and cost less. If the much talked about semiconductor TV screen ever materializes the sampling filter would be sufficiently inexpensive to be used in the home TV receiver; a reduction of the present TV channel bandwidth to about one-eighth could be expected in this case.

SUMMARY OF THE INVENTION

It is an object of the present invention to provide a two dimensional filter based on Walsh functions for a function having two space variables $x$ and $y$.

The theoretical basis for filtering a signal F($x$, $y$) of the two space variables $x$ and $y$ is the Walsh-Fourier transform of two variables:

$$a(\kappa,\mu)=\int_{-\infty}^{\infty}\int_{-\infty}^{\infty}F(x,y)\ \mathrm{wal}\ (\kappa,x)\ \mathrm{wal}\ (\mu,y)dxdy \quad (1)$$

$$F(x,y)=\int_{-\infty}^{\infty}\int_{-\infty}^{\infty}a(\kappa,\mu)\ \mathrm{wal}\ (\kappa,x)\ \mathrm{wal}\ (\mu,y)d\kappa d\mu \quad (2)$$

In a practical case, the function F($x$, $y$) will be of interest in a finite interval only, which can be chosen to be $-½ \leq x < +½, -½ \leq y < +½$. Equations (1) and (2) reduce then to the following form:

$$a(\kappa,\kappa)=a(k,m)$$

$$=\int_{-½}^{½}\int_{-½}^{½}F(x,y)\ \mathrm{wal}\ (k,x)\ \mathrm{wal}\ (m,y)dxdy \quad (3)$$

$$F(x,y)=\sum_{m=0}^{\infty}\sum_{\kappa=0}^{\infty}a(k,m)\ \mathrm{wal}\ (k,x)\ \mathrm{wal}\ (m,y) \quad (4)$$

A filtered signal $F_o(x,y)$ is obtained from (4) by multiplying $a(k,m)$ by an attenuation coefficient K($k$,$m$). Furthermore, one can space shift the output signal by substituting the shifted variables $x-x_o$ and $y-y_o$ in the functions wal($k$,$x$) and wal($k$,$y$). These shift parameters $x_o$ and $y_o$ are of little interest since they indicate only, that the filtered signal is displayed at another location than the original signal. A change of location can usually be ignored and one obtains thus the following expression for the filtered output signal $F_o(, y)$:

$$F_o(x,y)=\sum_{m=0}^{\infty}\sum_{\kappa=0}^{\infty}K(k,m)a(k,m)\ \mathrm{wal}\ (k,x)\ \mathrm{wal}\ (m,y) \quad (5)$$

According to a broader aspect of the invention there is provided a method for filtering a signal having at least two space variables $x$ and $y$, comprising the steps of a first step of transforming a plurality of signals derived from the space domain into a plurality of signals in a sequency domain, eliminating certain ones of said transformed signals to achieve a desired resolution, and a second step of transforming the remainder of said plurality of signals in the sequency domain back into the space domain.

The above and other objects of the invention will be more clearly understood from the following description with reference to the accompanying drawings in which:

BRIEF DESCRIPTION OF THE DRAWINGS

FIG. 1$a$ shows the special relationship of the function F($x$,$y$) represented by 16 voltages $a$ . . . $p$;

FIG. 7 shows block pulses blo($k$,$x$) blo($m$,$y$) for $k$, $m$=0 . . . 7;

FIG. 9 comprising FIGS. 9$a$ and 9$b$ is an illustration of sampling by block pulses and Walsh functions using the crossbar principle;

FIG. 11 is a truth table of the generator shown in FIG. 10;

DESCRIPTION OF THE PREFERRED EMBODIMENT

The practical implementation of a filter will be explained with reference to FIG. 1. The function $F(x,y)$ is represented by 16 voltages $a \ldots p$ as shown in FIG. 1*a*. These 16 voltages are fed to 16 wires that intersect the four printed circuit boards denoted by wal$(0,x)$ to wal$(3,x)$. Only the four wires for the voltages $a$, $d$, $m$ and $p$ are shown as dashed lines in order to avoid obscuring the figure. The other wires are only indicated by dots where they intersect the boards. Each board has four operational amplifiers; voltages fed through the resistors R to the positive (+) input are summed; those fed to the negative (−) are summed with reversed sign. At the outputs of the board wal$(0,x)$ occur the four voltages $a+b+c+d$, $e+f+g+h$, $i+j+k+l$ and $m+n+o+p$; the topmost output of the board wal$(1,x)$ yields the voltage $-a-b+c+d$, etc.

These output voltages are fed to 16 wires that intersect the four boards wal$(0,y)$ . . . wal$(3,y)$. Again, only four wires are shown as dashed lines, the others are only indicated by dots where they intersect the boards, The outputs 00, 10, . . . $km$, . . . 33 of these boards yield the transform $$a(k, m)=16\int_{-1/2}^{1/2}\int_{-1/2}^{1/2}F(x, y)\text{ wal }(k, x)\text{ wal }(m, y)dxdy$$

of the input voltage $f(x,y)$. An example is shown in FIG. 1 for $k$=2, $m$=3. The positive and negative signs of the voltages $a \ldots p$ as written in the lower right corner correspond to the positive and negative values of the Walsh function wal$(2,x)$ wal$(3,y)$ ) in FIG. 8.

Figures 1, 1A, 2, 4:
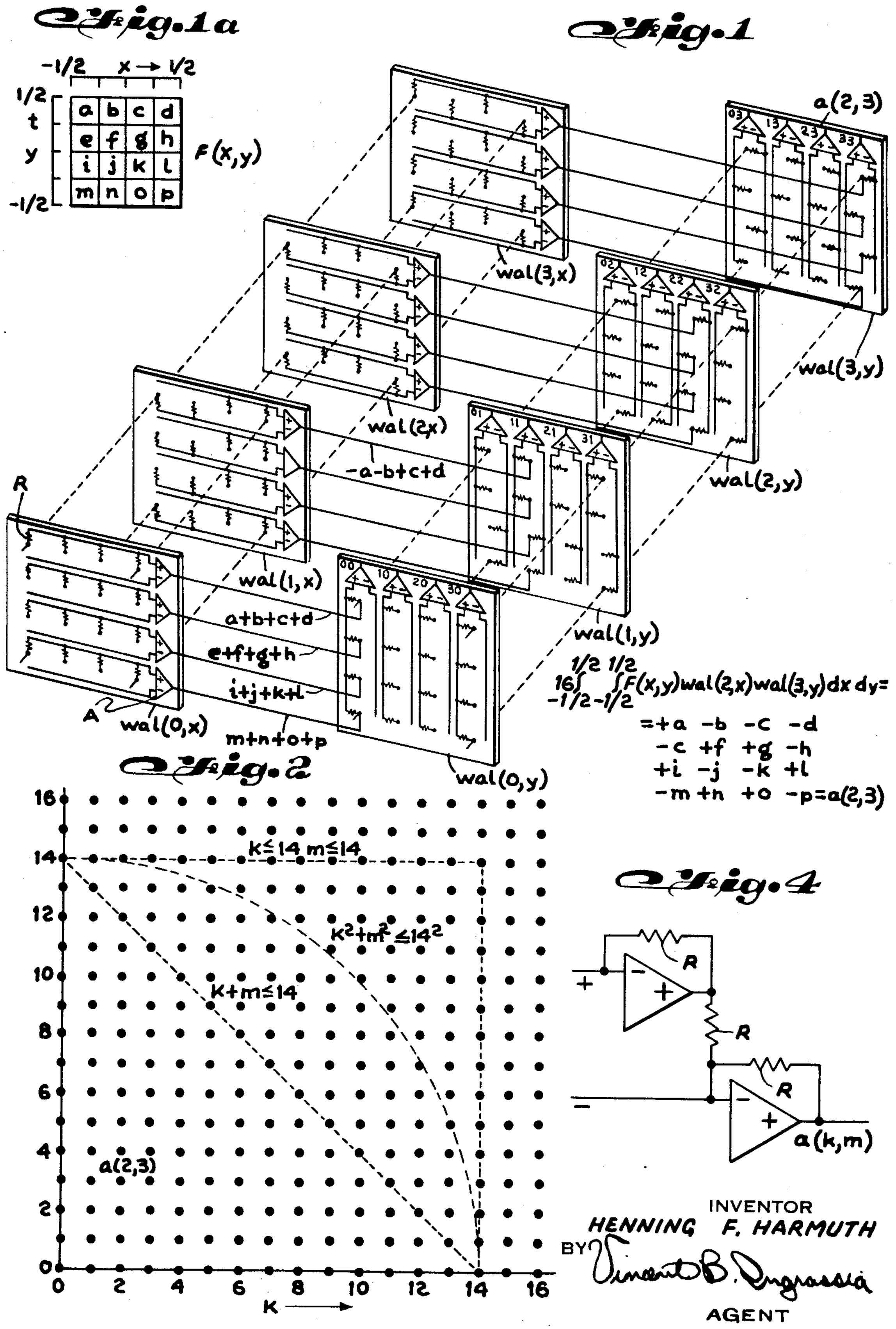
FIG. 1 shows a sequency filter for functions of two space variables x and y.
FIG. 2 is a graph of the $k$,$m$ plane of the two dimensional sequency domain with three band limits for low pass filters.
FIG. 4 shows summing amplifiers which are connected to the positive and negative branch of the output k,m of FIG. 3.

The inverse transformation of $a(k,m)$ into $F(x,y)$ is accomplished by a circuit essentially identical to that of FIG. 1. The filtering process is performed by not feeding some of the voltages $a(k,m)$ to this inverse circuit which makes the respective coefficients $K(k,m)$ in (5) equal zero. In particular, three simple low pass filters are obtained by feeding only those voltages $a(k,m)$ to the inverse circuit for which the following relations hold:

a. $k \leq r, m \leq r$
b. $k+m \leq r$
c. $k^2=m^2 \leq r^2$ where $r$ is a pre-selected number which characterizes the band limit.

For a discussion of these filters, consider the two dimensional sequency domain shown in FIG. 2. The $xy$ plane of the space domain is replaced by the $\kappa\mu$ or km plane in the sequency domain. The value of a coefficient $a(k,m)$ should be plotted vertically above or below this plane at the point $k,m$. However, for the simple filters defined by (6), it is not necessary to plot the value $a(k,m)$. It is sufficient to indicate where it should be plotted which is done in FIG. 2. The three limits defined by (6) are shown by dashed lines for $r$=14. The coefficients lying between the origin and these limits are fed to the circuit that performs the inverse transformation from the sequency domain to the space domain and yields the output signal $F_o(x, y)$:

$$F_o(x, y)=\sum_{m=o}^{\infty}\sum_{k=o}^{\infty}K(k, m)a(k, m)\text{ wal }(k, x)\text{ wal }(m, y) \quad (7)$$

$$\begin{aligned}
(a)\ K(k, m)&=1 && \text{for } k\leq r,\ m\leq r\\
&=0 && \text{for } k>r,\ m>r\\
(b)\ K(k, m)&=1 && \text{for } k+m\leq r\\
&=0 && \text{for } k+m>r\\
(c)\ K(k, m)&=1 && \text{for } k^2+m^2\leq r^2\\
&=0 && \text{for } k^2+m^2>r^2
\end{aligned}$$

Figures 3, 6:
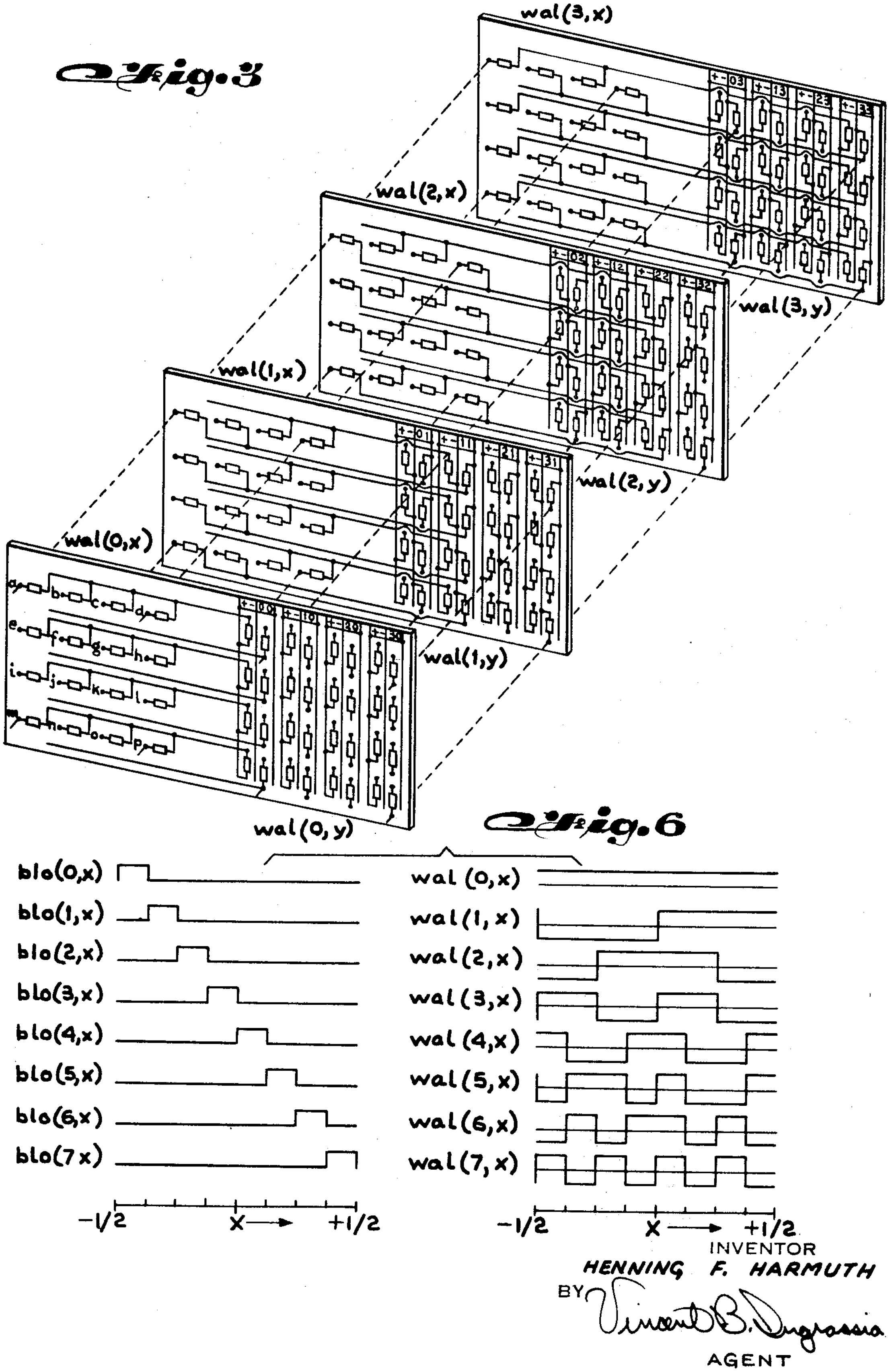
FIG. 3 shows a more practical version of the circuit shown in FIG. 1.
FIG. 6 shows a series of block pulses blo($k$,$x$) and Walsh functions wal($k$,$x$) wherein $k$=0 . . . 7.

A more practical version of the filter of FIG. 1 is shown in FIG. 3. The boards wal$(k,x)$ and wal$(k,y)$ are combined into one. No operational amplifiers are on the boards but summing amplifiers of the type shown in FIG. 4 do have to be connected to the positive (+) and negative (−) branch of each output 00 . . . km . . . 33 as shown in FIG. 4.

For a numerical example consider a filter with 16 × 16 inputs rather than 4 × 4 inputs as in FIGS. 1 and 3. A total of 16 boards would be required, each one having 48 socket pins for feeding in $F(x,y)$ and feeding out $a(k,m)$. There would be 3 × 256 = 768 holes to feed these wires through and about 2,000 more for the resistor leads. There would be 3 × 256 = 768 resistors per board, or a total of 16 × 768 = 12,288 resistors. A filter of this size is about the limit for the individual component technique. Its resolution should be sufficient for character recognition. Using thick film technique one could build such a filter up to about 64 × 64 inputs. This is far short of the 512 × 512 inputs required to obtain the resolution of TV pictures. However, a TV picture changes 30 times per second at the most. The time response of the filter could be made some 100 to 1,000 times faster. Such a filter is thus inefficiently used in TV signal filtering and one will look for some time sharing method.

Figures 5, 9A, 9B, 17:
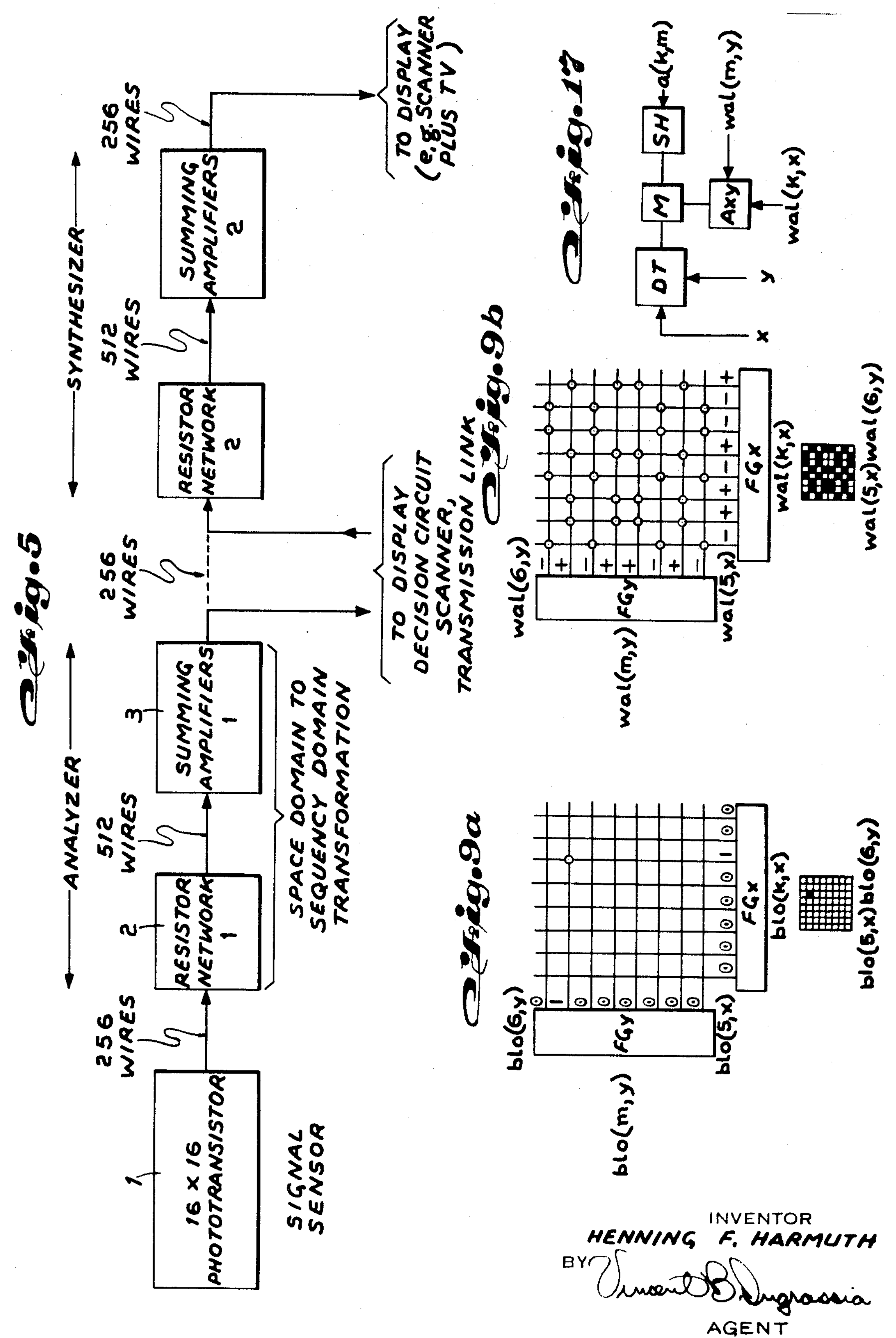
FIG. 5 shows a block diagram for the analysis and synthesis for a space function F($x$,$y$)
FIG. 17 shows an arrangement for the reconstruction of an image from the Walsh-Fourier coefficients $a$(k,m).

FIG. 5 shows how a filter for a space function $F(x,y)$ can be used to analyze and synthesize this function in analogy to the analysis and synthesis of a voice signal $F(t)$ by a filter bank. The signal sensor for a voice signal is a microphone; it is replaced by a two dimensional array of photo transistors 1. The 16 × 16 outputs are fed to a resistor network 2 according to FIG. 3, but having 16 × 16 inputs rather than 4 × 4. The outputs of this network are fed to summing amplifier 3 according to FIG. 4. The output voltages of these amplifiers represent the input signal $F(x,y)$ by its Walsh-Fourier transform $a(k,m)$ in the $km$ plane of the two dimensional sequency domain according to FIG. 2. The analogon in voice decomposition are the sine and cosine transforms of the voice signal $F(t)$, $$a_s(\nu)=\int_{-\infty}^{\infty}F(t/T)\sqrt{2}\sin 2\pi\nu t/T\cdot d(t/T)$$

$$a_c(\nu)=\int_{-\infty}^{\infty}F(t/T)\sqrt{2}\cos 2\pi\nu t/T\cdot d(t/T)$$

but one usually displays the power spectrum $a_s^2(\nu) + a_c^2(\nu)$ instead of the transforms.

The function $a$(I k,m) may be used for an analysis of the input signal and may presumably yield for printed or written characters of an alphabet pattern that correspond to the formants in voice analysis. Another way of using the function $a(k,m)$ is to suppress it for those of $k$ and $j$ for which it is small for all or most input signals. This corresponds to the low pass filtering of voice signals. Less bandwidth is required for the transmission of such a filtered signal. At the receiver, it is retransformed from the two dimensional sequency domain to the two dimensional space domain. The circuit performing this retransformation is essentially identical to the analyzer in FIG. 5.

Sampling in two-space dimensions is usually based on the system of block pulses. FIG. 6 shows eight such pulses and defines the notation blo($k$,$x$) used for them. Block pulses with two space variables are defined by the product blo($k$,$x$) blo($m$,$y$). The 64 functions for $k$,$m$=0 . . . are shown in FIG. 7. Black areas indicate that the function blo($k$,$x$) blo($m$,$y$) has the value +1; white areas that it has the value 0. The function blo($k$,$x$) · blo($m$,$y$) is found at the intersection of the column denoted blo($k$,$x$) and the row denoted blo($m$,$y$). The functions are shown in the interval $-½ \leq x < ½$, $-½ \leq y < ½$. One may see that the black areas representing the pulse with value +1 moves in the row blo(0,$y$) from left to right as the parameter $k$ of blo($k$,$x$) increases from 0 to 7. In the row blo(1,$y$) it moves again from left to right, while the parameter $k$ of blo($k$,$x$) increases. Hence, the black area moves like the illuminated spot on a TV screen that is scanned from left to right and from bottom to top. Sampling may thus be considered to represent the decomposition of a function F($x$,$y$) by the system of block pulses blo($k$,$x$) blo($m$,$y$).

FIG. 6 also shows eight Walsh functions and the notation wal($k$,$x$) used for them. Walsh functions with the two variables $x$ and $y$ are similarly defined by the product wal($k$,$x$) wal($m$,$y$). These functions are shown for $k$, $m$=0 . . . 7 in the interval $-½ \leq x < ½$, $-½ \leq y < ½$in FIG. 8. The function wal($k$,$x$) wal($m$,$y$) is found at the intersection of the column denoted wal($k$,$x$) and the row denoted wal($m$,$y$). Black areas indicate that wal($k$,$x$) · wal($m$,$y$) has the value +1; white areas that it has the value −1.

Consider the decomposition of a function F($x$,$y$), which may be an image, into the system of block pulses blo($k$,$x$) blo($m$,$y$) and the system of Walsh functions wal($k$,$x$) wal($m$,$y$). The block pulses of FIG. 7 differ only in the location of their black areas. If all parts of the function F($x$,$y$) are equally important there is no reason why any of the block pulses should be less important than the others and could be suppressed by filtering. The situation is different for the Walsh functions of FIG. 8. The function wal(0,$x$) wal(0,) represents the average value of F($x$,$y$) or the average brightness if F($x$,$y$) is an image; the function wal(1,$x$) wal(0,$y$) represents the difference in the average value of F($w$,$y$) in the intervals $0 \leq x < ½$and $-½ \leq x < 0$; the function wal(7,$x$) wal(7,$y$) represents rather fine details of F($x$,$y$); etc. The different patterns of the Walsh function thus open the way to filtering. The filtering is accomplished in the simplest case by not sampling F($x$,$y$) in the particular Walsh function pattern which one wants to suppress.

A possible implementation of a Walsh function sampling device will be explained with reference to FIG. 9. The left part of the illustration shows a sampler using the crossbar principle and using block pulses. The function generator FG$x$ produces the function blo(5,$x$) which is represented by a voltage zero at all vertical bars except at the bar 6 to which the voltage 1 is applied. Similarly, the generator FG$y$ produces the function wal(6,$y$) which is represented by a voltage zero at all horizontal bars except at the bar 7, to which the voltage 1 is applied. The crossing of the two bars with voltage 1 applied is indicated by a black dot. This dot represents the function blo(5,$x$) · blo(6,$y$). In practical equipment, the voltage 1 at the horizontal bar 7 would usually be a negative voltage −1. The magnitude of the voltage difference would then be 2 at the indicated crossing and 1 or 0 at all others. However, the transformation of the crossbar principle shown in FIG. 9 into its many practical realizations will not be discussed here.

Sampling by the crossbar principle according to Walsh function is shown on the right hand side of FIG. 9. The function wal(5,$x$) represented by positive and negative voltages applied to the vertical bars is supplied by the function generator FG$x$, while the generator FG$y$ supplies the function wal(6,$y$) to the horizontal bars. The crossings of bars with equal applied voltages are indicated by dots. One may readily see that this dot pattern corresponds to the black areas of the function wal(5,$x$) wal(6,$y$). The white areas correspond to the crossing where a voltage difference exists. One may note that sampling according to Walsh functions with values +1 or −1 yields voltage differences at the bar crossings of magnitude 2 or 0 while voltage differences of magnitude 2, 1 or 0 are produced by sampling according to block pulses.

The cross bar principle is presently the most likely one to be used if flat TV screens on semiconductor basis ever become practical. However, FIG. 9 may also represent information storage in a magnetic core storage. The usual way is to store one bit in one core or one word in one storage location. This corresponds to storage according to block pulses. Storage according to Walsh functions would distribute each bit over all (or one-half of all) cores or each word over all storage locations. It is interesting to note that the destruction of one storage location destroys the information stored in this location completely and leaves all other information unchanged in case of the block pulse storage. In the case of Walsh function storage, all information would be degraded resulting in smaller output pulses but no information would be completely destroyed. In theory, such a storage would remain operable as long as more than half the storage locations are operating.

Figures 8, 10:
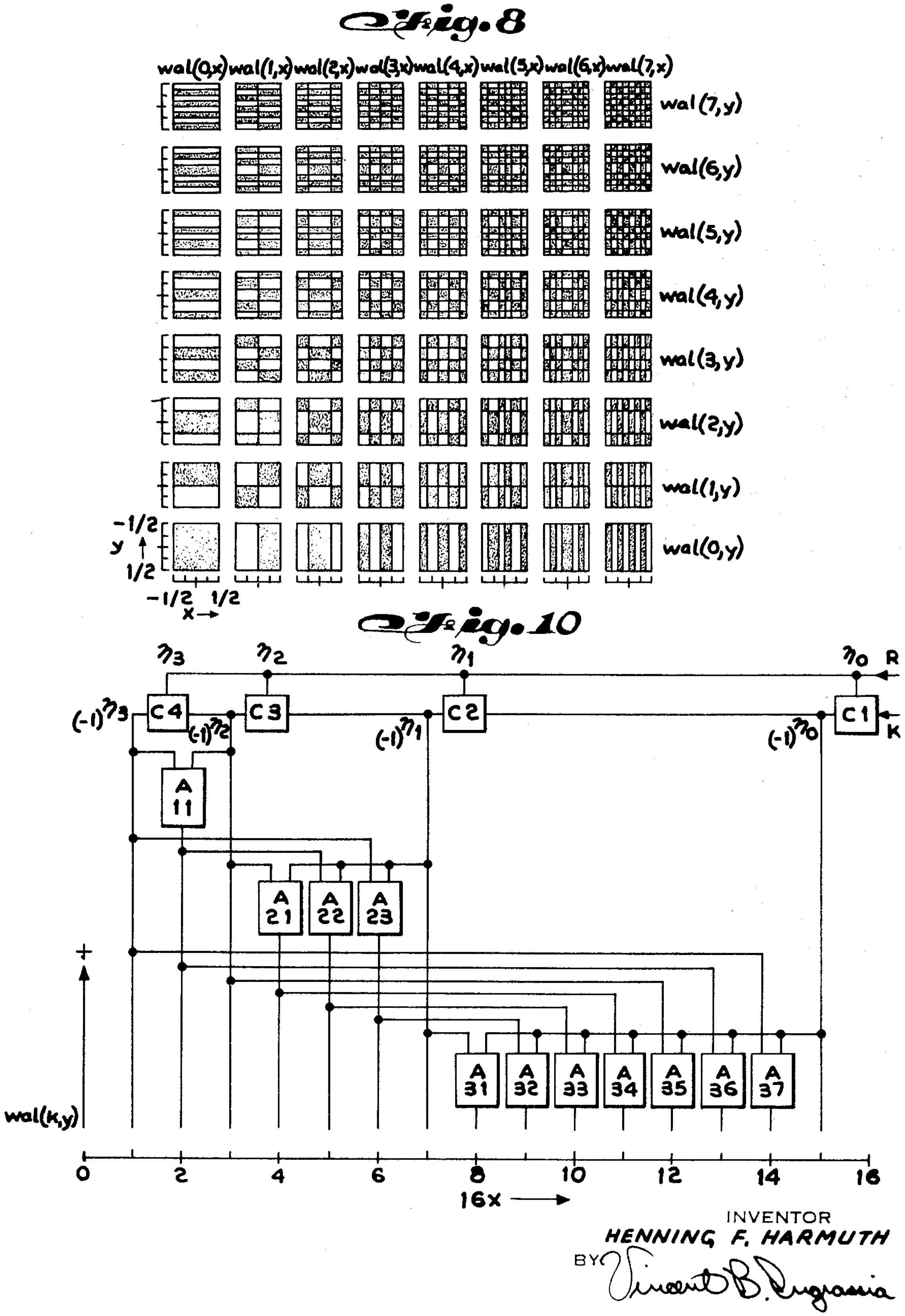
FIG. 8 shows Walsh functions wal($k$,$x$) wal($m$,$y$) for $k$, $m$=0 . . . 7
FIG. 10, represents a generator for Walsh functions wal($k$,$x$) of the space variable $x$.

Generators for time and space variable Walsh functions that automatically produce a set of such functions are required for the implementation of sampling filters. FIG. 10 shows an example of such a generator. Let the binary counters be in the state that represents the number $k = \eta_3 2^3 + \eta_2 2^2 + \eta_1 2^1 + \eta_0 2^0$, where the coefficients $\eta_0 \ldots \eta_3$ are 0 or 1. The output voltages of the counters are denoted by $(-1)\eta_0 \ldots (-1)\eta_3$. The voltage $(-1)\eta_0$ is +1 for $\eta_0 = 0$ and −1 for $\eta_0 = 1$. Actually, the output voltages will be +V or 0, but it is more convenient to denote them by +1 and −1.

The generator has 16 output terminals denoted by 0, 1 . . . 15. The voltages at these terminals represent the

Walsh functions wal($k,x/16$) which are orthonormal in the interval $0 \leq x<16$. Changing the marking of the terminals from 0,1, . . . 15 to 0/16, 1/16 . . . 15/16 produces the functions wal($k,x$), which are orthonormal in the interval $0 \leq x<1$. FIG. 11 shows the voltages at the output terminals for the possible values of $k$=0,1 . . . 15. The numbers $\eta_0$ . . . $\eta_3$ give the binary representation of $k$; the numbers $(-1)\eta_0 \ldots (-1)\eta_3$ the output voltages of the counter stages in FIG. 10. The voltages at the output terminals 0,1 . . . 15 are denoted by + or a −, where +indicates a positive voltage while − indicates a negative voltage or the voltage 0 depending on the biasing of the circuit. One may readily see that the number $k$ stored in the counter stages produces the function wal($k,x$) at the output terminals. A sequence of trigger pulses applied to the input terminal K in FIG. 10 will thus produce the 16 functions wal($k,x$) for $k$=0, 1, . . . 15. A pulse applied to the input terminal R resets all counters to $k$=0.

It is worthwhile to contemplate the complexity of a generator that produces a sequency of functions 1, sin $2\pi kx$, cos $2\pi kx$ from trigger pulses.

Figure 12:
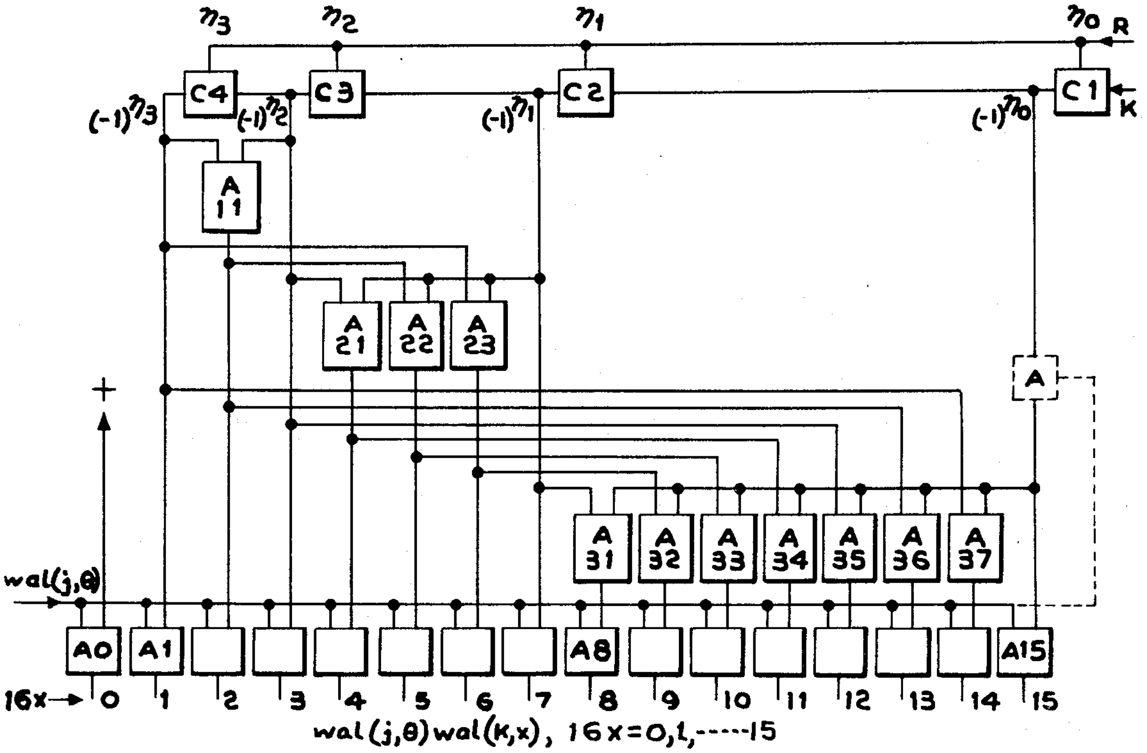
FIG. 12 shows a generator for space-time functions wal($k$,$x$) wal($j$,$\theta$) based on the generator of FIG. 10.

FIG. 12 shows an example of a generator for the functions wal($k,x$) wal($j,\theta$) derived from the generator for wal($k,x$) in FIG. 10. The output voltages 0,1 . . . 15 in FIG. 10 are multiplied with the time function wal($j,\theta$) in the half adders AO, A1, . . . A15. The voltages at their outputs represent the space-time functions wal($k,x$) wal($j,\theta$). The dashed line and the half adder A indicate a possible simplification of the circuit: the half adders A8 to A15 may be replaced by the one half adder A.

Figures 13, 14:
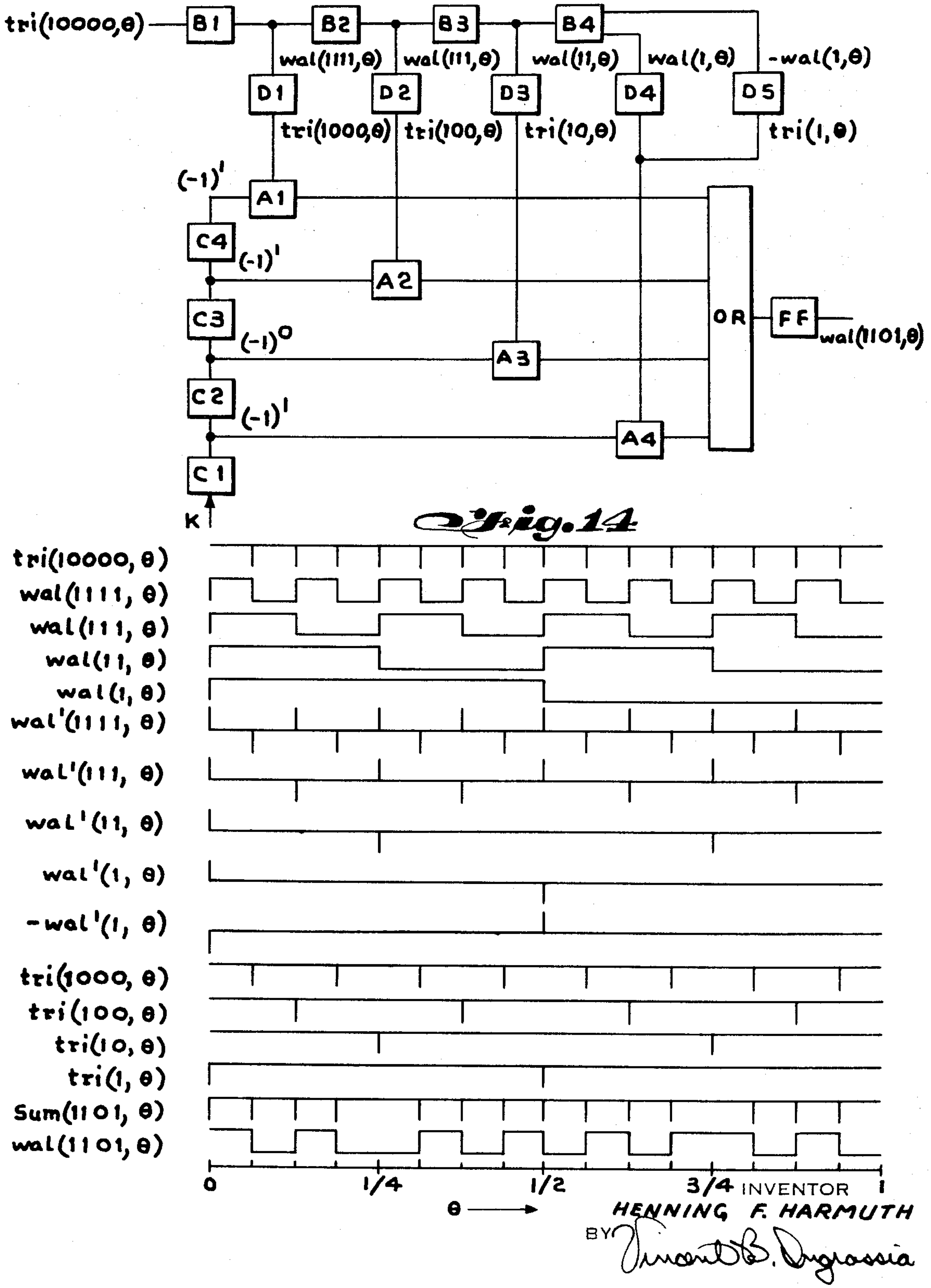
FIG. 13 shows a generator for time variable Walsh functions wal($j$, $\theta$)
FIG. 14 shows a time diagram for the generator shown in FIG. 13.

FIG. 13 shows a generator for time variable Walsh functions wal($j,\theta$) and FIG. 14 shows its pulse diagram. The binary counter stages B1 to B4 produce Rademacher functions that are differentiated in D1 to D5. The obtained negative trigger pulses tri(1000,$\theta$) to tri(1,$\theta$) may or may not pass through the AND-gates A1 to A4 to the OR-gate OR and trigger the flip-flop FF. Which pulses may pass through the AND-gates A1 to A4 is determined by the output voltages of the counter stages C1 to C4 which represent k as a binary number.

Figure 15:
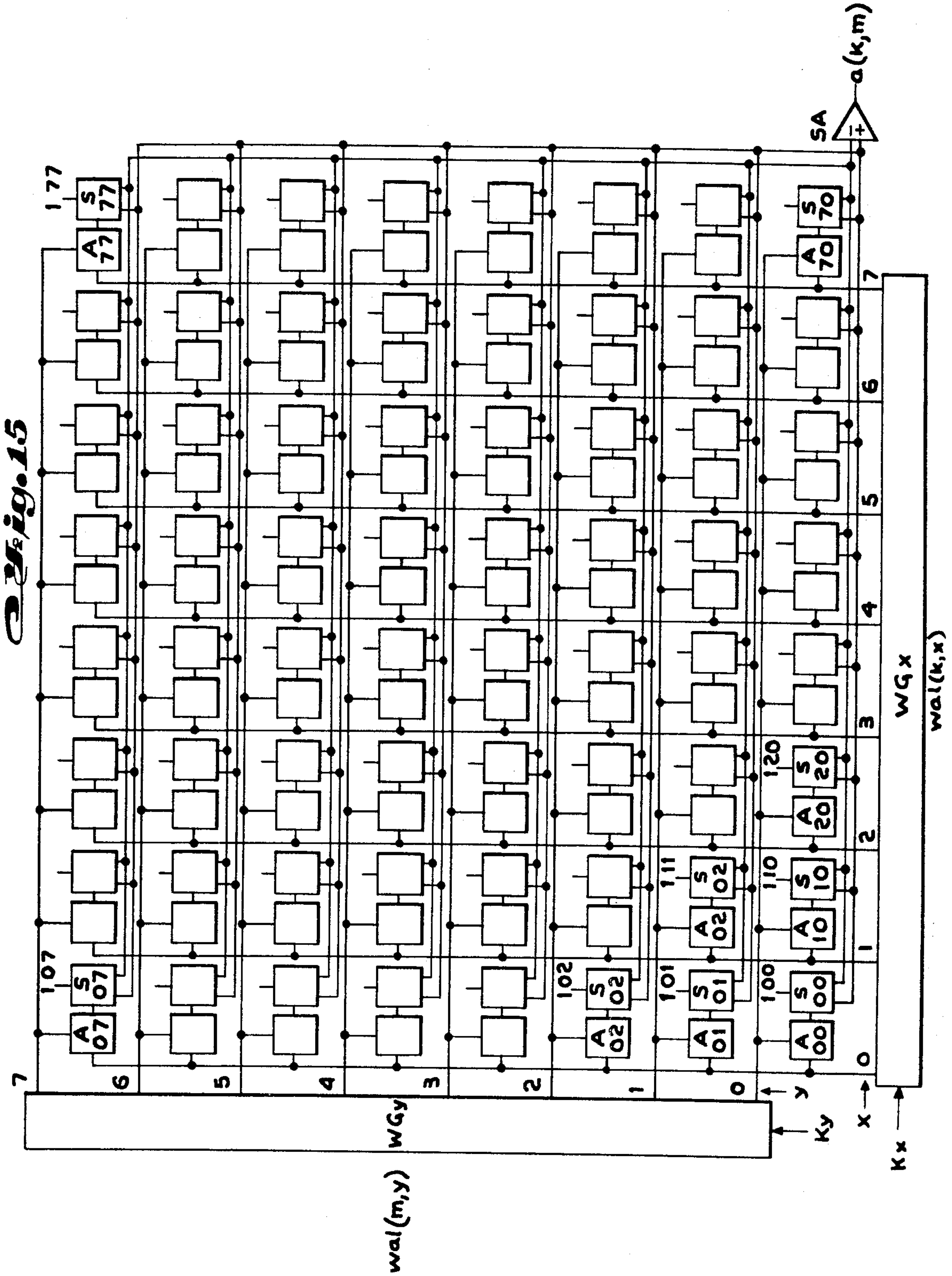
FIG. 15 illustrates transformation of a space function $F(x,y)$ represented by 64 voltage samples into a sequency function $a(k,m)$

One of several ways to implement a two dimensional sampling filter according to FIG. 9$b$ is shown in FIG. 15. Two Walsh function generators WG$x$ and WG$y$ feed functions wal($k,x$) and wal($m,y$) to the vertical and horizontal crossbars. A half adder A00 to A77 and a single-pole, double-throw switch S00 to S77 is located at each bar crossing. If the voltages at two crossing bars are equal, the input $i$ of the switch is connected to the positive (+) input of the summing amplifier SA; if they are not equal, $i$ is connected to the negative input (−) of SA. The output voltage of the summing amplifier SA represents the Walsh-Fourier transform $a(k,m)$ of the signal F($x,y$) applied to the inputs $i$00 to $i$77 of the filter.

The filtering process requires that each sample $a(k,m)$ is multiplied by an attenuation coefficient K($k,m$) and the inverse transformation be performed according to (5). In the simplest cases K($k,m$) is either 1 or 0. The coefficients $a(k,m)$ for which K($k,m$) is zero do not need to be produced at all. Consider as example a low-pass filter according to FIG. 2 that multiplies all coefficients $a(k,m)$ by 1 for $k \leq 6$, $m \leq 6$ and by 0 for $k>6$, $m>6$. The Walsh function generator WG$y$ would then produce the function wal(0,$y$) while the generator WG$x$ would produce successively the functions wal(o,$x$) wal(1,$x$) . . . wal(6,$x$). The coefficients $a(0,0)$, $a(1,0)$ . . . $a(6,0)$ are obtained at the output of the summing amplifier SA. The generator WG$y$ then produces the function wal(1,$y$) and the generator WG$x$ produces again wal(0,$x$) wal(1,$x$), . . . wal(6,$x$). The coefficients $a(1,0)$, $a(1,1)$, . . . $a(1,6)$ are obtained. This process continues until the function wal(6,$y$) is produced by generator WG$y$ and functions wal(0,$x$) wal(1,$x$), . . . wal(6,$x$) by the generator WG$x$. If the Walsh function generators are driven by trigger pulses via binary counters as e.g. in FIG. 10 and 12, the filtering process is performed by resetting the counters whenever they reach a predetermined value. This may be a fixed value as in the case just discussed but there is no great problem to reset according to the conditions $k+m \leq r$ or $k^2+m^2 \leq r^2$ which yields more complicated low-pass filters according to FIG. 2.

Figure 16:
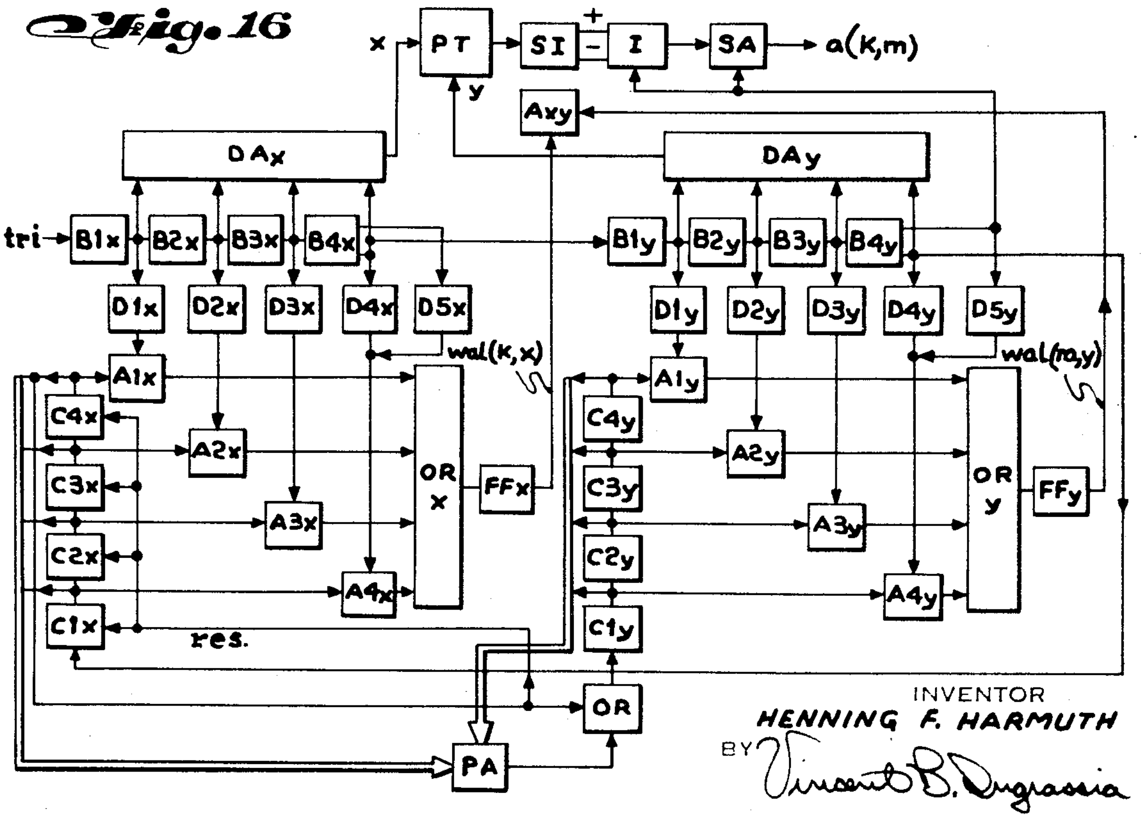
FIG. 16 shows a sampling filter for images of TV quality.

A sampling filter that can be built with existing components for images of TV quality will be discussed with reference to FIG. 16. The basic idea is to produce the Walsh-Fourier coefficients $a(k,m)$ by means of a usual image scanning device. The output of the scanning device is fed into an integrator either directly or after polarity reversal. The polarity reversal is done according to the positive and negative values of a two-dimensional Walsh function wal($k,x$) wal($m,y$). At the end of a complete scan, the output voltage of the integrator represents $a(k,m)$. FIG. 16 shows the necessary building blocks on top: PT (pick-up tube) is the image scanner, SI the switch that reverses polarity of the scanned voltage, I the integrator and SA the sampling switch.

The generator for the functions wal($k,x$) consists of the blocks B1$x$ . . . B4$x$, D1$x$ . . . x, C1$x$ . . . C4$x$, A1$x$ . . . A4$x$,OR $x$ and FF$x$. This circuit is identical with the one shown by FIG. 13. For images of TV quality one would have to have nine counter stages B and C instead of the four shown. The binary number represented by the counter stages B1$x$ . . . B4$x$ is transformed by the digital/analog converter DA$x$ into an analog voltage that is applied to the horizontal deflection plates of the scanner PT. The blocks with the index $y$ generate in an analogous manner the functions wal($k,y$) and the vertical deflection voltage for the scanner PT.

Trigger pulses applied to the input of B1$x$ produce a time function wal($k,\theta$) = wal($k,x$) at the output of FF$x$. The number $k$ is determined by the counter stages C1$x$ to C4$x$. Sixteen trigger pulses bring the stages B1$x$ to B4$x$ back to their initial state. The converter DA$x$ produces a deflection voltage that increases linearly with each trigger pulse e but drops back suddenly to zero when the 16th pulse is applied. Whenever a counting cycle of B1$x$ to B4$x$ is completed, a trigger pulse is sent to B1$y$. The operation of the blocks denoted by $y$ is thus essentially the same as that of the blocks denoted by $y$, except that their trigger period is 16 times longer.

When the counter B1$x$ to B4$x$ has run through 16 cycles, the counter B1 $y$ to B4$y$ has run through one cycle, and one scan of the scanning device PT is completed. An output pulse from B4$y$ now advances the counter C1$x$ to C4$x$ by 1. The Walsh function wal ($k$+1, $\pi$)=wal ($k$+1, $x$) will now be produced instead of wal$(k,\theta)$. *In principle, the process continues until the counter B1x* to B4xhas run through $16^2$cycles, the counter B1y to B4y through 16 cycles and the counter C1x to C4x through one cycle. A trigger pulse is then sent from C4x through OR-gate OR to C1y. The Walsh function wal$(m+1,y)$ will then be produced.

One completed cycle of the counter C1y to C4y requires 16 cycles of the counter C1x to C14x ,$16^2$cycles of the counter B1y to B4 y and $16^3$ cycles of the counter B1x to B4x.

Filtering in FIG. 16 is accomplished by means of the preset arithmetic unit PA. The numbers *k* and *m* stored in the counter C1x to C4 x and C1xto C4y are fed to PA. Let them for example, be added in PA. Whenever the sum k+m exceeds 14 a reset pulse resets counter C1x. . . C4 x to k=0, while counter C1y. . . C4 y is advanced by a pulse sent through OR to C1y. The resulting filter is characterized by the line $k+m \leq 14$ in FIG. 2. The coefficients $a(k,m)$ are produced in the following sequence: $a(0,0)$ $a(1,0)$, . . . $a(14,0)$, $a(0,1)$ $a(1,1)$, . . . $a(13,1)$ $a(0.2)$, $a(1,2)$, . . . $a(12,2)$, $a(3,0)$, $a(3,1)$, . . . etc. $a(0.13)$, $a(0,14)$.

One complete scan in *x and y* is required to produce one coefficient $a(k,m)$ by the circuit of FIG. 16. For TV quality resolution of an image, one must use about $512 \times 512 = 2^9 \times 2^9$ scanning points. The four stage counters in FIG. 16 would have to be replaced by nine stage counters. This does not add much to the complexity of the circuit, but the time required to produce all coefficients $a(k,m)$ increases very fast. An image with $512 \times 512$ scanning points produces $512^2 = 2^{18}$independent coefficients $a(k,m)$. In principle, the decomposition by Walsh functions requires $2^{18}$ complete scans while the decomposition of block pulses requires only one. In practice, the situation is somewhat better since it is known that only about one-eighth of the coefficients $a$(k,m) are required which can be obtained by $2^{15}$ complete scans. It will be shown later that this number can be reduced, theoretically to one complete scan, by using more complicated circuits than the one shown in FIG. 16. But, there is no question that the flying spot scanner is poorly suited for Walsh function scanning, while the crossbar scanner is ideally suited.

Let the $2^{15}$ scans be done in 64 seconds, which is an acceptable time for the transmission of still pictures in certain applications. The scanner would then have to perform $2^9$complete scans per second. The scanning has thus to be done $2^4 = 16$ times faster than by the usual TV pick-up tubes that scan 30 $2^5$ times per second. The numbers obtained are quite reasonable and it is worthwhile to look for a method that reduces the scanning rate by one two orders of magnitude.

FIG. 17 shows how a picture is reconstructed from the coefficients $a(k,m)$. The scanner PT of FIG. 16 is replaced by a cathode ray display tube DT with long persistent screen. The circuit blocks SI, I and SA of FIG. 16 are replaced by a sample-and-hold circuit SH and a multiplier M. The hold circuit SH holds the voltage representing $a(k,m)$ during the time of a complete scan of the tube DT. The brightness of the tube must be set to half its maximum value. The voltage $a(k,m)$ passes the multiplier M either unchanged, when wal$(k,x)$ and wal$(m,y)$ have the same value, or with reversed polarity if wal$(k,x)$ and wal$(k,y)$ do not have the same value. The brightness of the image displayed by the display tube will then have the pattern of the Walsh function wal$(k,x)$ wal $(m,y)$ and will be proportional to $a(k,m)$.

It is to be understood that the foregoing description of specific examples of this invention is made by way of example only and is not to be considered as a limitation on its scope.

I claim:

1. An apparatus for filtering an input signal for at least two space variables *x* and *y* comprising:
 - a crossbar matrix having a plurality of horizontal crossing bars and a plurality f vertical crossing bars forming cross points;
 - a first Walsh Function generator coupled to the vertical crossbars of said crossbar matrix;
 - a second Walsh Function generator coupled to the horizontal crossbars of said crossbar matrix;
 - comparing means coupled to each of said cross points for comparing the voltages of said first and second Walsh Function generator:
 - a source of voltage samples derived from the space domain of said input signal:
 - means for summing said voltage samples according to the outputs of said first and second Walsh Function generators tor transforming said voltage samples from the space domain of said input signal into a plurality of signals in a sequency domain;
 - means for eliminating certain ones of said transformed signals to achieve a desired resolution; and
 - a second means for transforming the remainder of said plurality of signals in said sequency domain back into said space domain.

2. An apparatus according to claim 1, wherein said means for summing further comprises:
 - a summing amplifier having a positive and negative input; and
 - a plurality of switching elements each one coupled to one of said comparing means and one of said voltage samples for directing said voltage samples to the positive input of said summing amplifier when voltages of said first and second Walsh function generators at the crosspoint are equal, and to the negative input of said summing amplifier when the voltages of said first and second Walsh function generators at the crosspoint are not equal, the output of said summing amplifier representing the Walsh-Fourier transform of the applied signal.

3. An apparatus according to claim 2 wherein said comparing means are half adders.

4. An apparatus according to claim 3 wherein said switching elements are single-pole double-throw switches.

* * * * *